United States Patent
Tanaka

(10) Patent No.: US 9,436,066 B1
(45) Date of Patent: Sep. 6, 2016

(54) LEAF SHUTTER SYSTEM FOR INTERCHANGEABLE LENS CAMERAS

(71) Applicants: SONY CORPORATION, Tokyo (JP); SONY PICTURES ENTERTAINMENT INC., Culver City, CA (US)

(72) Inventor: Kazunori Tanaka, Irvine, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 0 days.

(21) Appl. No.: 14/817,098

(22) Filed: Aug. 3, 2015

(51) Int. Cl.
*G03B 17/14* (2006.01)

(52) U.S. Cl.
CPC ..................... *G03B 17/14* (2013.01)

(58) Field of Classification Search
CPC ................... G03B 9/08; G03B 17/14
See application file for complete search history.

(56) References Cited

U.S. PATENT DOCUMENTS

| | | | | |
|---|---|---|---|---|
| 3,635,142 A * | 1/1972 | Ataka | ..................... | G03B 17/14 396/462 |
| 3,747,495 A * | 7/1973 | Tenkumo | ................. | G03B 7/20 396/264 |
| 3,776,115 A * | 12/1973 | Kanno | ..................... | G03B 9/08 396/254 |
| 4,920,372 A * | 4/1990 | Nakagawa | ............... | G03B 7/10 396/238 |
| 6,337,955 B1 * | 1/2002 | Shono | ..................... | G03B 17/48 348/E5.024 |

FOREIGN PATENT DOCUMENTS

GB  2080558 B  7/1983

* cited by examiner

*Primary Examiner* — WB Perkey
(74) *Attorney, Agent, or Firm* — Procopio, Cory, Hargreaves & Savitch, LLP

(57) ABSTRACT

A camera system, including: an interchangeable lens; an internal shutter configured to open and close; and a lens detector coupled to the internal shutter and capable of accepting the interchangeable lens, the lens detector configured to detect the presence of a leaf shutter within the interchangeable lens, wherein the lens detector generates a shutter signal to keep the internal shutter open when the presence of the leaf shutter within the interchangeable lens is detected. Key words include interchangeable lens and leaf shutter.

20 Claims, 2 Drawing Sheets

LEAF SHUTTER SYSTEM FOR INTERCHANGEABLE LENS CAMERAS

BACKGROUND

1. Field of the Invention

The present disclosure relates to a camera system, and more specifically, to a camera system capable of accepting an interchangeable lens with or without a leaf shutter.

2. Background

Some mirrorless cameras have shutters in the camera body to control exposure times. These can be loud, drawing unwanted attention to the photographer, or perturb the subjects, which often ruins the image. The physical motions of large shutters also move and vibrate the camera body, reducing image sharpness. A quiet and still camera system would be useful for street and casual photography where stealth is needed, as well as in art and landscape photography, where optimal image quality is desired.

A shutter in front of a sensor is also necessarily large as it has to be big enough to cover the entire sensor. This results in a slower operation as well as longer blackout times in the viewfinder or rear liquid crystal display (LCD). Thus, a shutter in front of the sensor makes the operation of the camera feel sluggish, unless a damped and powerful shutter mechanism can be used. This can be costly and large (like in the Canon 1D X or Nikon D4S sports cameras) and is difficult to implement in a small form factor. A shutter in front of the sensor also necessitates more complicated flash electronics to allow for a higher sync speed. Even with extra flash features that allow for higher sync speeds (usually beyond 1/250 s), there is still a drawback of limited flash power output.

SUMMARY

The present disclosure provides for a camera system capable of accepting an interchangeable lens with or without a leaf shutter.

In one implementation, a camera body is disclosed. The camera body includes: an internal shutter configured to open and close; and a lens detector coupled to the internal shutter and capable of accepting an interchangeable lens, the lens detector configured to detect the presence of a leaf shutter within the interchangeable lens, wherein the lens detector generates a shutter signal to keep the internal shutter open when the presence of the leaf shutter within the interchangeable lens is detected.

In another implementation, a camera system is disclosed. The camera system includes: a camera body; an interchangeable lens configured to be attachable to the camera body, wherein the camera body comprises: an internal shutter configured to open and close; and a lens detector coupled to the internal shutter and capable of accepting the interchangeable lens, the lens detector configured to detect the presence of a leaf shutter within the interchangeable lens, wherein the lens detector generates a shutter signal to keep the internal shutter open when the presence of the leaf shutter within the interchangeable lens is detected.

In another implementation, a camera is disclosed. The camera includes: an interchangeable lens; a camera body including an internal shutter and a lens detector, the camera body comprising: an internal shutter configured to open and close; and a lens detector coupled to the internal shutter and capable of accepting the interchangeable lens, the lens detector configured to detect the presence the interchangeable lens with a leaf shutter.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

As stated above, cameras with shutters in the camera body can be loud, which often ruins the image. The physical motions of large shutters also move and vibrate the camera body, reducing image sharpness. Although there are cameras with leaf shutter lenses attached to them permanently (and without a shutter in front of the sensor), these cameras do not allow the user to change the lens.

Certain implementations as disclosed herein provide for interchangeable lenses with leaf shutters in them and can be attached to the cameras. In one implementation, when an interchangeable lens with a leaf shutter is attached to the camera, the shutter in the camera body is disabled (i.e., the shutter is forced to stay open), while the quieter leaf shutter in the interchangeable lens is used. When a regular lens is attached to the camera, the internal shutter is used as usual.

After reading this description it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

Figure 1:
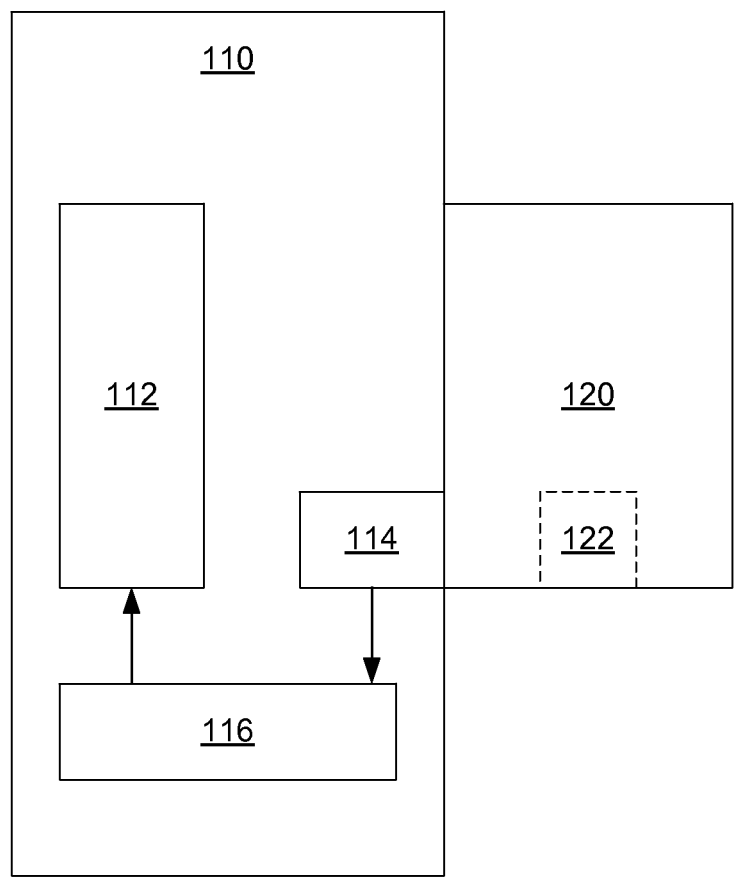
FIG. 1 is a functional block diagram of a camera system in accordance with one implementation of the present disclosure.

FIG. 1 is a functional block diagram of a camera system 100 in accordance with one implementation of the present disclosure. In the illustrated implementation of FIG. 1, the camera system 100 includes a camera body 110 and an interchangeable lens 120. In one implementation, the camera body 110 includes an internal shutter 112, a lens detector 114, and a controller 116. Although not shown in FIG. 1, the camera system 100 may further include a lens, an image sensor, an image processor, and other related elements.

In one implementation, the lens detector 114 detects the presence of an interchangeable lens 120 and notifies the controller 116. When the lens detector 114 detects the interchangeable lens 120 with a leaf shutter 122 in it, the lens detector 114 notifies the controller 116 of the presence of the leaf shutter in the lens 120. In this case, the controller 116 controls the internal shutter 112 to keep the shutter open so that the leaf shutter 122 in the interchangeable lens 120 can be used. However, when the lens detector 114 detects the interchangeable lens 120 with no leaf shutter in it, the lens detector 114 notifies the controller 116 and the controller 116 controls the internal shutter 112 such that the camera system 100 can use the internal shutter 112 as usual.

In an alternative implementation, the functions of the lens detector 114 and the controller 116 can be combined so that the combined detector/controller can detect the presence of an interchangeable lens with leaf shutter and control the internal shutter appropriately. In a further implementation, the camera body 110 of an existing camera system can be used with just a lens detector 114 added. For example, in an existing camera system with no capability to keep the internal shutter open, the lens detector can be added and configured to adjust the shutter speed to a slowest speed when the interchangeable lens with a leaf shutter is detected by the lens detector.

Figure 2:
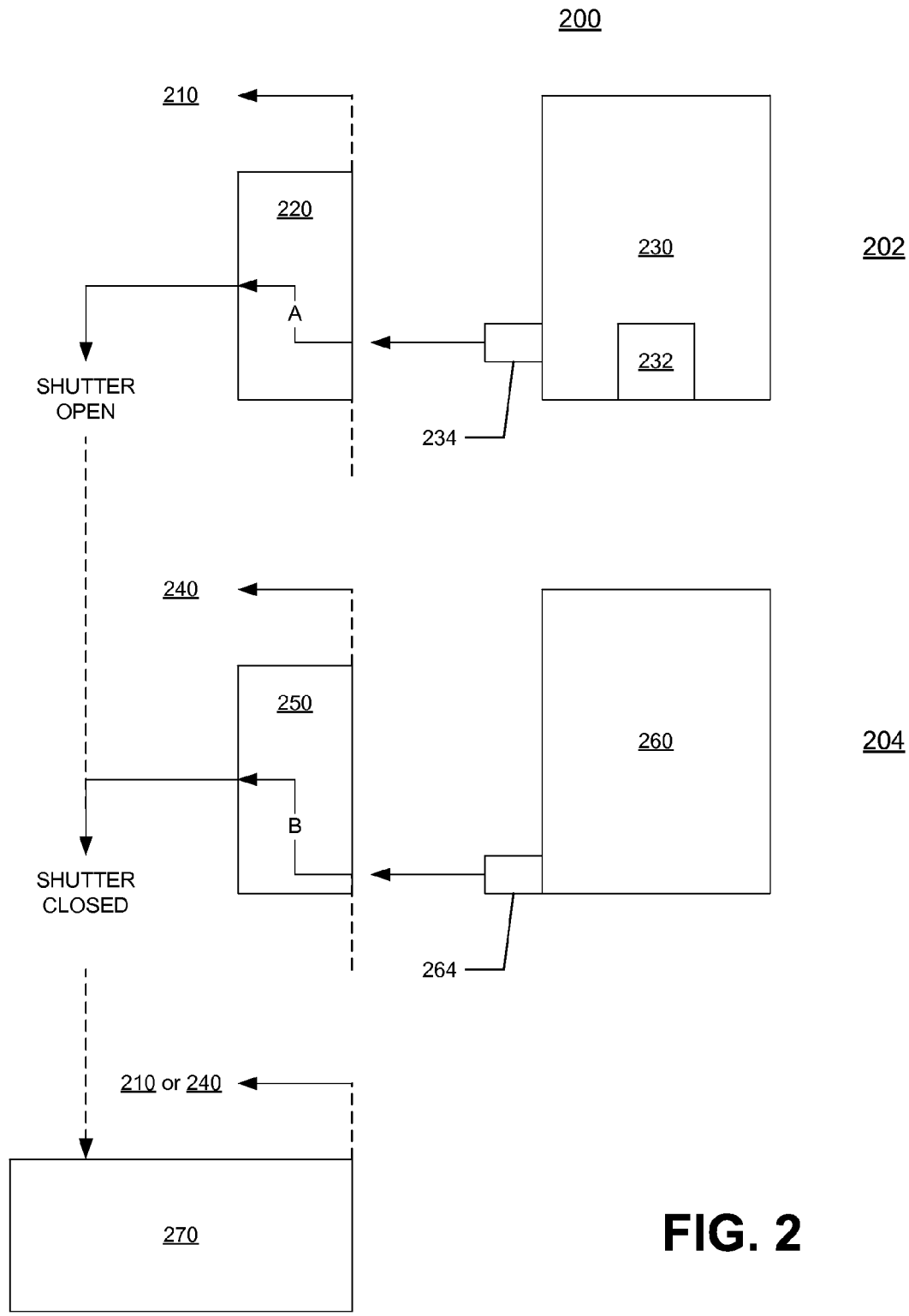
FIG. 2 is a functional block diagram of a detection process in accordance with one implementation of the present disclosure.

FIG. 2 is a functional block diagram of a detection process 200 in accordance with one implementation of the present disclosure. The illustrated implementation of FIG. 2 shows two cases 202, 204 of attaching an interchangeable lens 230, 260 to a camera system 210, 240.

The first case 202 involves the interchangeable lens 230 including a leaf shutter 232 being attached to the camera system 210. In this case 202, the interchangeable lens 230 includes a tab 234 in a first position (position A), which the lens detector 220 in the camera system 210 detects the interchangeable lens 230 as including the leaf shutter 232. In one implementation, the tab 234 is a physical protrusion on the interchangeable lens 230. Further, the lens detector 220 includes a mechanical means for detecting the configuration of the tab 234. In another implementation, the lens detector 220 includes an electrical means for detecting the configuration of the tab 234. In another implementation, the tab 234 is a marking on the interchangeable lens 230 which can be optically detected by the lens detector 220. In yet another implementation, the tab 234 is an electrical wiring configured to be detected electrically by the lens detector 220. In general, the lens detector 220 in the camera system 210 is configured to detect the existence or lack of something (e.g., a tab, a marking, an electrical wiring, a hole, etc.) on the interchangeable lens 230 to identify the existence or lack of at least one leaf shutter 232 in the interchangeable lens 230. The lens detector 220 then sends a signal to the controller 270 to command the internal shutter in the camera system 210 to keep the internal shutter open.

The second case 204 involves the interchangeable lens 260 without a leaf shutter being attached to the camera system 240. In this case 204, the interchangeable lens 260 includes a tab 264 in a second position (position B), which the lens detector 250 in the camera system 240 detects the interchangeable lens 260 as not including a leaf shutter. In one implementation, the tab 264 is a physical protrusion on the interchangeable lens 260. Further, the lens detector 250 includes a mechanical means for detecting the configuration of the tab 264. In another implementation, the lens detector 250 includes an electrical means for detecting the configuration of the tab 264. In another implementation, the tab 264 is a marking on the interchangeable lens 260 which can be optically detected by the lens detector 250. In yet another implementation, the tab 264 is an electrical wiring configured to be detected electrically by the lens detector 250. The lens detector 250 then sends a signal to the controller 270 to command the internal shutter in the camera system 240 to keep the internal shutter closed during the normal operation and open the internal shutter only when the shutter button on the camera system 240 is pressed.

In an alternative implementation, an interchangeable lens without a leaf shutter attaches to the body of a camera system similar to any interchangeable lens being attached to the camera system, while an interchangeable lens with a leaf shutter includes means for identifying itself to the lens detector such that the lens detector detects the presence of the leaf shutter in the interchangeable lens. In one implementation, the means for identifying includes one or more mechanical element. In other implementations, the means for identifying includes electrical, electronic, or combination of elements to enable the lens detector to detect the presence of the leaf shutter in the interchangeable lens.

Accordingly, the camera system, when used with an interchangeable lens with at least one leaf shutter in it, provides benefits of: a quieter operation; less vibration caused by the camera body; a faster flash sync speed (limited only by the speed of the leaf shutter); and a faster operation and responsiveness, allowing for a better user experience and the ability to get the shot (e.g., due to a shorter blackout time in the viewfinder.

The foregoing is susceptible to many variations. Additionally, the description has been simplified for clear and brief explanation. Many descriptions use terminology and structures of specific standards. However, the disclosure is more broadly applicable.

Those of skill in the art will appreciate that the various illustrative logical blocks, modules, units, and algorithm steps described in connection with the implementations disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the disclosure. In addition, the grouping of functions within a unit, module, block, or step is for ease of description. Specific functions or steps can be moved from one unit, module, or block without departing from the disclosure.

The above description of the disclosed implementations is provided to enable any person skilled in the art to make or use the disclosure. Various modifications to these implementations will be readily apparent to those skilled in the art, and the generic principles described herein can be applied to other embodiments without departing from the spirit or scope of the disclosure. Accordingly, the techniques are not limited to the specific examples described above. It is understood that the scope of the present disclosure fully encompasses other implementations that may become obvious to those skilled in the art and that the scope of the present disclosure is accordingly limited by nothing other than the appended claims.

The invention claimed is:

1. A camera body, comprising:
an internal shutter configured to open and close; and
a lens detector coupled to the internal shutter and capable of accepting an interchangeable lens, the lens detector configured to detect the presence of a leaf shutter within the interchangeable lens,
wherein the lens detector generates a shutter signal to keep the internal shutter open when the presence of the leaf shutter within the interchangeable lens is detected.

2. The camera body of claim 1, further comprising
a controller coupled to the internal shutter and the lens detector, the controller configured to receive the shutter signal and command the internal shutter to stay open.

3. The camera body of claim 1, wherein the lens detector detects the presence of the leaf shutter within the interchangeable lens by detecting a configuration of a tab on the interchangeable lens.

4. The camera body of claim 3, wherein the lens detector includes a mechanical means to detect the configuration of the tab.

5. The camera body of claim 3, wherein the lens detector includes an electrical means to detect the configuration of the tab.

6. The camera body of claim 3, wherein the lens detector detects the configuration of the tab by detecting a position of the tab on the interchangeable lens.

7. The camera body of claim 6, wherein the position of the tab is different for the interchangeable lens with the leaf shutter than the interchangeable lens without the leaf shutter.

8. The camera body of claim 3, wherein the lens detector detects the configuration of the tab by detecting the presence of the tab on the interchangeable lens.

9. A camera system, comprising:
a camera body;
an interchangeable lens configured to be attachable to the camera body,
wherein the camera body comprises:
an internal shutter configured to open and close;
a lens detector coupled to the internal shutter and capable of accepting the interchangeable lens, the lens detector configured to detect the presence of a leaf shutter within the interchangeable lens,
wherein the lens detector generates a shutter signal to keep the internal shutter open when the presence of the leaf shutter within the interchangeable lens is detected.

10. The camera system of claim 9, wherein the lens detector detects the presence of the leaf shutter within the interchangeable lens by detecting a configuration of a tab on the interchangeable lens.

11. The camera system of claim 10, wherein the tab is a physical protrusion on the interchangeable lens.

12. The camera system of claim 10, wherein the tab is a marking on the interchangeable lens.

13. The camera system of claim 12, wherein the marking on the interchangeable lens is optically detected by the lens detector.

14. The camera system of claim 10, wherein the tab is an electrical wiring.

15. The camera system of claim 14, wherein the electrical wiring is electrically detected by the lens detector.

16. A camera, comprising:
an interchangeable lens having a leaf shutter indicator that indicates the interchangeable lens includes a leaf shutter;
a camera body comprising:
an internal shutter configured to open and close; and
a lens detector coupled to the internal shutter, the lens detector configured to detect the leaf shutter indicator,
wherein the leaf shutter indicator does not protrude into the camera body.

17. The camera of claim 16, wherein the lens detector is configured to generate a shutter signal to keep the internal shutter open when the presence of the leaf shutter indicator is detected.

18. The camera of claim 16, wherein the leaf shutter indicator is a hole in the interchangeable lens.

19. The camera of claim 16, wherein the leaf shutter indicator is a marking on the interchangeable lens.

20. The camera of claim 16, wherein the leaf shutter indicator is an electrical wiring.

* * * * *